United States Patent
Klein et al.

(10) Patent No.: US 8,266,295 B2
(45) Date of Patent: Sep. 11, 2012

(54) SYSTEM AND METHOD FOR DETECTING AND MITIGATING DNS SPOOFING TROJANS

(75) Inventors: Amit Klein, Herzliya (IL); Zohar Golan, Ein Hahoresh (IL)

(73) Assignee: EMC Corporation, Hopkinton, MA (US)

( * ) Notice: Subject to any disclaimer, the term of this patent is extended or adjusted under 35 U.S.C. 154(b) by 900 days.

(21) Appl. No.: 11/884,776

(22) PCT Filed: Feb. 26, 2006

(86) PCT No.: PCT/IL2006/000254
§ 371 (c)(1),
(2), (4) Date: Aug. 21, 2007

(87) PCT Pub. No.: WO2006/090392
PCT Pub. Date: Aug. 31, 2006

(65) Prior Publication Data
US 2008/0147837 A1    Jun. 19, 2008

Related U.S. Application Data

(60) Provisional application No. 60/655,442, filed on Feb. 24, 2005.

(51) Int. Cl.
*G06F 13/00* (2006.01)

(52) U.S. Cl. .................. 709/227; 709/219; 709/224

(58) Field of Classification Search .................. 709/217, 709/219, 223, 224, 227, 250
See application file for complete search history.

(56) References Cited

U.S. PATENT DOCUMENTS

| | | | |
|---|---|---|---|
| 7,072,944 B2 * | 7/2006 | Lalonde et al. | 709/206 |
| 7,313,815 B2 * | 12/2007 | Pazi et al. | 726/7 |
| 7,380,272 B2 * | 5/2008 | Sharp et al. | 726/11 |
| 7,529,802 B2 * | 5/2009 | Nelson et al. | 709/206 |
| 7,580,982 B2 * | 8/2009 | Owen et al. | 709/206 |
| 2004/0039827 A1 | 2/2004 | Thomas et al. | |
| 2004/0103318 A1 | 5/2004 | Miller et al. | |

OTHER PUBLICATIONS

International Search Report for International Application No. PCT/IL06/00254 mailed Aug. 1, 2007.

* cited by examiner

*Primary Examiner* — Viet Vu
(74) *Attorney, Agent, or Firm* — BainwoodHuang

(57) ABSTRACT

Embodiments of the present invention relate to a method and system for detecting and/or mitigating domain name system (DNS) spoofing Trojan horse (or Trojan) code. Trojan code (sometimes called malware or malicious software) is a common computer security problem. Some Trojans modify the DNS resolution mechanism employed by the infected computer, such that the computer traffic, when browsing the Internet, is routed to a location not intended by the rightful owner of the computer. The present invention can detect this phenomenon from a remote device or location and may take action to mitigate its effects.

50 Claims, 2 Drawing Sheets

SYSTEM AND METHOD FOR DETECTING AND MITIGATING DNS SPOOFING TROJANS

CROSS-REFERENCE TO RELATED APPLICATIONS

This application is a National Phase Application of PCT International Application No. PCT/IL2006/000254, entitled "SYSTEM AND METHOD FOR DETECTING AND MITIGATING DNS SPOOFING TROJANS", International Filing Date Feb. 26, 2006, published on Aug. 31, 2006 as International Publication No. WO 2006/090392, which in turn claims priority from U.S. Provisional Patent Application No. 60/655,442, filed Feb. 24, 2005, both of which are incorporated herein by reference in their entirety.

FIELD OF THE INVENTION

The invention relates to the field of Internet communication, and, more specifically, to the field of Internet security.

BACKGROUND OF THE INVENTION

Trojans are malicious software "viruses" that upon infecting the target machine (e.g., a user's personal computer (PC)), may work stealthily towards undesired goals, such as compromising the user's credentials and/or private information by disclosing them to an unintended third party, e.g., the Trojan's owner or sender. Trojans can be used as part of a "phishing" attack to obtain information from the victim. One technique employed by Trojans may be fooling the user into thinking that he (the user) is browsing a secure site or a site of a trusted party (for example, a bank's web site), while in fact he is accessing a different site, which may, for example, be a site maintained by the Trojan's owner. This tactic may be known as domain name system (DNS) spoofing, and it may be used to eventually obtain a victim's credentials, passwords, account or other personal information, as he logs in to what he thinks is the secure or trusted website.

One way in which Trojans spoof a machine's DNS is by adding entries to the operating system "hosts" file. Different operating systems store the hosts file in different locations. Thus, for example, in Windows NT/2000/2003/XP, the full file path may be %windir%\system32\drivers\etc\hosts; in Windows 95/98/ME, the full file path may be C:\Windows\hosts; in UNIX systems and in Mac OS/X, the full file path may be /etc/hosts; and in Mac OS/9 and below, the file name may be Hosts, and it is located in the Preference folder (it also has a different format, but it allows the same kind of manipulation by Trojans). The hosts file typically contains static DNS mapping (e.g., mapping from alphanumeric host name to a numeric IP address), and it may be consulted by the computer during the process of resolving the IP address of a domain name entered by the user.

Below is an example of a hosts file from Windows/XP that has not been manipulated or infiltrated:

```
# Copyright (c) 1993-1999 Microsoft Corp.

# This is a sample HOSTS file used by Microsoft TCP/IP for Windows.

# This file contains the mappings of IP addresses to host names. Each
# entry should be kept on an individual line. The IP address should
# be placed in the first column followed by the corresponding host name.
# The IP address and the host name should be separated by at least one
# space.

# Additionally, comments (such as these) may be inserted on individual
# lines or following the machine name denoted by a '#' symbol.

# For example:

#      102.54.94.97     rhino.acme.com    # source server
#       38.25.63.10     x.acme.com        # x client host
127.0.0.1        localhost
```

Typically, a mapping or entry in the hosts file may take precedence over other mappings, such as DNS server queries. Therefore, by adding entries to the hosts file, Trojan software may force the victim machine (typically a PC) to map the name of a desired website (e.g., www.nosuchbank.com), which host name will be used herein as an example of a client's bank website to an IP address controlled by the Trojan's owner (e.g., 10.20.30.40), instead of to www.nosuchbank.com's real IP address. The below example demonstrates the hosts file as it may look after it has been manipulated by a Trojan. The reader will note that the last line in the file has been added by the Trojan.

```
# copyright (c) 1993-1999 Microsoft Corp.

# This is a sample HOSTS file used by Microsoft TCP/IP for Windows.

# This file contains the mappings of IP addresses to host names. Each
# entry should be kept on an individual line. The IP address should
# be placed in the first column followed by the corresponding host name.
# The IP address and the host name should be separated by at least one
# space.

# Additionally, comments (such as these) may be inserted on individual
# lines or following the machine name denoted by a '#' symbol.

# For example:

#      102.54.94.97     rhino.acme.com    # source server
#       38.25.63.10     x.acme.com        # x client host
127.0.0.1        localhost
10.20.30.40      www.nosuchbank.com
```

Consequently, the user's PC, upon his typing www.nosuchbank.com in the browser's address bar, will send an HTTP request to 10.20.30.40 (instead of to the real IP address of www.nosuchbank.com), and the user will see in the browser whatever page is found on 10.20.30.40 (instead of the contents of www.nosuchbank.com's website). Thus, rather than being presented with the true page on www.nosuchbank.com's website, the user is presented with the page created by the fraudster to capture the user's sensitive information. Thus, for example, if the web page purporting to be the secure or trusted website requests sensitive or valuable login details, the user may submit them trustingly, unknowingly providing them to the fraudster. Consequently, the fraudster may easily collect from the 10.20.30.40 server valuable credentials from users.

Alternatively, a Trojan may alter the DNS server entry in the network (TCP/IP) stack of the user machine, to point at a malicious DNS server (which may typically be operated by the Trojan master). In such case, each and every DNS resolution needed by the client will cause the network stack to consult the malicious DNS server. This server may be configured to reply with the genuine IP address of nearly all host names, except for one or a limited number of addresses, e.g., www.nosuchbank.com, which it will resolve to the fraudulent site, e.g., 10.20.30.40.

Known security solutions (such as anti-virus and anti-malware solutions) are able to detect that the hosts file or the DNS server configuration have been modified (or are hostile) when executed locally, on the infected machine itself. As such, these solutions are typically unable to provide an adequate solution for Internet service providers (ISPs) and other entities that do not have such access to their clients' machines, while at the same time have an incentive to protect those clients, as well as their own resources (network bandwidth, customer support call reduction, security) from this Trojan threat.

There is therefore a need for an improved method, apparatus and system for protecting against DNS spoofing attacks.

SUMMARY OF THE INVENTION

Embodiments of the present invention relate to methods for detecting attacks such as DNS spoofing attacks comprising receiving notification of an IP request, the IP request being associated with a requested IP address and a desired hostname, and detecting whether the requested IP address matches the desired hostname.

According to some embodiments of the invention, detecting whether the requested IP address matches the desired hostname may comprise comparing at least one property of the requested IP address with a comparable property of the desired hostname.

According to some embodiments of the invention, if the IP address does not match the desired hostname, the method may further comprise preventing connection to said IP address.

According to some embodiments of the invention, the step of detecting may comprise obtaining a true hostname associated with the requested IP address, and comparing the true hostname with the desired hostname. In some embodiments, obtaining a true hostname associated with the requested IP address may comprise using a reverse DNS lookup database. In some embodiments, obtaining a true hostname associated with the requested IP address may comprise using a WHOIS database to look up identity of the requested IP address.

According to some embodiments of the invention in which the IP request is made by a subscriber, if the IP address does not match the hostname, the method may further comprise sending a notification to the subscriber.

According to some embodiments of the invention in which the IP request is made by a subscriber, if the IP address does not match the hostname, the method may further comprise directing the subscriber to an Internet website informing the subscriber.

According to some embodiments of the invention, if the IP address does not match the hostname, the method may further comprise sending a notification to a third party.

According to some embodiments of the invention in which the IP request is made by a subscriber, if the IP address does not match the hostname, the method may further comprise obtaining a correct IP address associated with the desired hostname, and directing a subscriber to the correct IP address.

According to some embodiments of the invention, the notification of the IP request may be a reply from a domain name server directed to a subscriber, the reply including the requested IP address.

According to some embodiments of the invention, the notification is an IP request received by an internet service provider (ISP) from a subscriber of the ISP.

According to some embodiments of the invention, the method may comprise receiving a notification of a request sent to a network address, the request being associated with a requested network address and a desired hostname, and detecting whether the requested network address matches the desired hostname. According to some embodiments of the invention, the network address may be an IPv6 network address.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
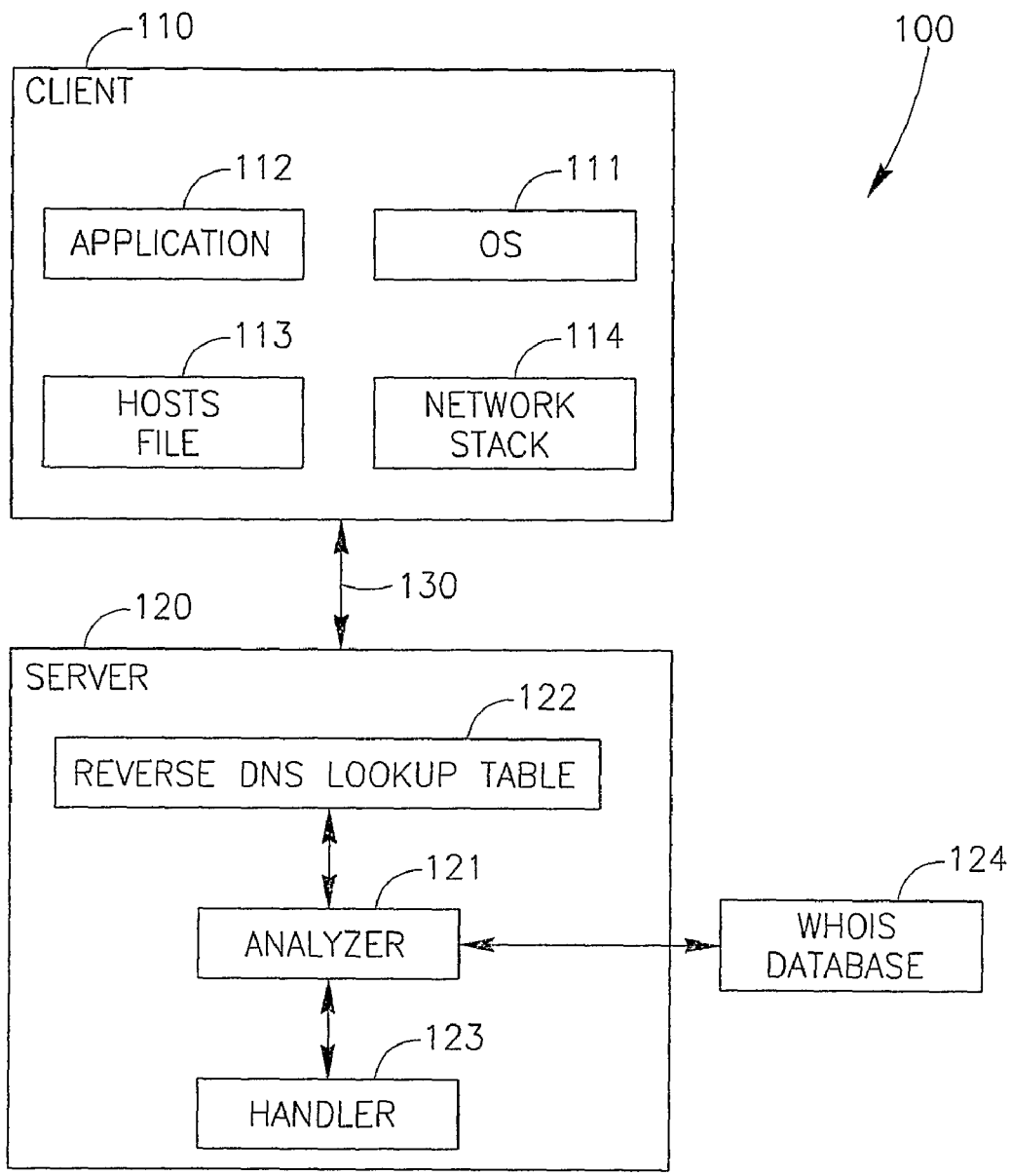
FIG. 1 is a schematic block diagram illustration of a communication system in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention. Various examples are given throughout this description. These are merely descriptions of specific embodiments of the invention, but the scope of the invention is not limited to the examples given.

In the following example embodiment of the present invention, an Internet service provider (ISP) may be provided with the ability to detect (and mitigate) from a remote location or device the existence of a DNS spoofing Trojan at some of its clients.

Typically, the ISP may monitor all Internet-bound (HTTP) traffic from the service's subscriber or client. It will be noted that a subscriber may typically log in to the service from different PC's, for example, from home, the office, a friend's house, an Internet café or kiosk, etc. Therefore, to continue the example provided above in the Background of the Invention, after the client's operating system resolves the alphanumeric hostname www.nosuchbank.com into the 10.20.30.40 IP address, the client's browser may send an HTTP request to that address. In that HTTP request, the client's browser may include an HTTP host header, with the value of the hostname. A typical request may look like this:

GET/HTTP/1.1
Accept: image/gif, image/x-xbitmap, image/jpeg, image/pjpeg, application/x-shock
wave-flash, application/vnd.ms-powerpoint, application/vnd.ms-excel, application
/msword, */*
Accept-Language: en-us Accept-Encoding: gzip, deflate
User-Agent: Mozilla/4.0 (compatible; MSIE 6.0; windows
   NT 5.1; SV1; .NET CLR 1.1
   0.4322)
Host: www.nosuchbank.com
Connection: Keep-Alive According to embodiments of the present invention, the ISP may be notified of this IP request in at least one of various forms, including direct receipt of the IP request from the client, or any other notification, such as, for example, a reply to the IP request, or notification by a third party of such IP request.

Upon notification of an IP request, the ISP may establish or verify a property of the desired hostname (or obtain a previously established or verified property of the desired hostname), and compare this correct or true property against an analogous property of the requested IP address, thereby verifying whether the requested IP address indeed truly corresponds to the hostname. This may be done in several ways, including, for example, combinations of one or more techniques described below.

According to some embodiments of the present invention, the property may be the IP address itself. Thus, upon being provided with notification of such IP request, the ISP may independently verify whether www.nosuchbank.com (the hostname, as requested by the browser) indeed matches the IP address requested.

In one embodiment of the invention, the property of the hostname and the requested IP address may be the owner of the website. Thus, the ISP may perform reverse DNS lookup of the IP address requested in order to determine whether the IP address it is in fact owned by the purported owner of the trusted website. Thus, continuing the example provided, reverse lookup of 10.20.30.40 would reveal that the canonical host name of the IP address is not in fact www.nosuchbank.com. Another alternative is to perform a WHOIS lookup for the IP address and to compare the owner of the IP address to the owner of the domain name (the domain name is derived from the host name). It will be recalled that a WHOIS database may contain nameserver, registrar, and in some cases, full contact information about a domain name. Each registrar must maintain a WHOIS database containing all contact information for the domains they host.

Alternately or additionally, according to an embodiment of the invention, the ISP may keep a cache of cleared IP addresses. Thus, once it is known that an IP address is cleared, the ISP may decide not to query it again for a predetermined period of time, thereby usually improving the performance of this method, as the clearance will not be needed to be performed each and every time.

Further additionally or alternatively, in an embodiment of the present invention, the property being compared may be related to IP class. Oftentimes, large institutions own complete class B/C address space, so it may be safe to assume that if the IP address is anywhere in the class B/C, the request is not problematic. Thus, for example, if one IP address for www.nosuchbank.com is known, other addresses in the same network class (e.g., class C, or class B) may be assumed safe, or at least of less risk. In some embodiments of the present invention, the ISP may not connect a client to a requested IP address if the IP address has different class B/C as a previously validated IP address for the same hostname. Conversely, the ISP may perform less or no security testing on a request for IP address where the IP address has the same class B/C as a previously validated IP address for the same hostname.

According to embodiments of the present invention, the ISP may perform heightened security checking against Trojan DNS spoofing, of the sort described herein, only with regard to IP requests containing certain hostnames, and not with regard to other hostnames. Thus, for example, the ISP may create a list of hostnames associated with companies that are likely to be hit by a phishing/Trojan scam, such as, for example, financial institutions. These hostnames may be associated, for example, at a database, with the ISP with the official IP addresses, and upon an IP request containing the hostname, the ISP may compare the requested IP address with those contained in the database. The database may be compiled, for example, by independent verification by the ISP, or, for example, by obtaining the official list from the likely targets. In some embodiments this database may contain known IP addresses of such "phishers", and the client's requested IP address may be compared against a "black list" of phishers' IP addresses. In some embodiments, domains that are more likely to be the subject of attacks may sponsor or pay to be placed in this database at the ISP. So, for example, www.nosuchbank.com may decide that it is a likely target for DNS spoofing Trojan, and it may register to such a service. Accordingly, an ISP employing an embodiment of the present invention may monitor Host headers with www.nosuchbank.com, and locate IP addresses that do not match the official IP address.

According to embodiments of the present invention, once phishing is detected, the ISP can react in one or a combination of the ways described below.

It will be remembered that the ISP allocated the client's IP address in the first place, and therefore, the ISP knows the identity of the client, as well as its contact information and billing address. Thus, the ISP may proactively inform the client that his PC is infected by a Trojan, thereby improving its client relations and its level of service.

According to some embodiments of the present invention, the ISP may send a notification to a third party. In one such embodiment, the ISP may contact a known "phish-fighter" such as Cyota® Consumer Solutions, an offering of RSA Security Inc., and provide it with the offending IP address and the domain name that was "mapped" to it. The phish-fighter can then take action to shut down that phishing website.

According to embodiments of the present invention, in response to an HTTP request whose destination IP address does not match the Host header value, the ISP may send a notification to the client. In one embodiment, the ISP may return a page informing the client that his/her PC is infected with a Trojan, and suggest that the client contact the ISP's customer support or a third party that may assist the user.

Finally, according to some embodiments of the invention, in response to an HTTP request whose destination IP address does not match the Host header value, the ISP may simply determine the correct website and silently reroute the request to that correct website.

It should be noted that embodiments of the present invention may be applicable to both types of DNS spoofing techniques in use by Trojans discussed above, i.e., changing the Hosts file, as well as changing the DNS server in use by the client machine. That is, the same solution may apply, because the HTTP request still passes through the ISP and still has a mismatching IP and hostname.

It should be noted, however, that the ISP can also detect the latter kind of attack by monitoring DNS responses returned to the client from the attacker's DNS server. For example, a DNS response that maps www.nosuchbank.com to 10.20.30.40 probably means that a phishing scam is at work here. In fact, in some embodiments of the present invention, it may be enough that the client uses a non-ISP DNS server to raise suspicion and trigger anti-phishing measures.

According to an embodiment of the present invention, a possible place to add this new proposed method and functionality is in an HTTP-aware device that sees all outbound traffic. This may, for example, be a transparent cache proxy server. A content-inspection server, if it monitors outbound HTTP traffic, may also be adequate. Likewise, it is possible to include this functionality in any product that performs network sniffing on the ISP's LAN.

Phishers may use non port-80 links in phishing emails, in order to avoid, or reduce the likelihood of interception by proxy servers, which are typically configured based on the assumption that the convention of using port 80 links would be followed. It will be noted that if the client types in the address bar a link he knows, e.g. to a banking site, it is unlikely to contain a non-standard port. However, if indeed a fraudster uses a non-port 80 link, the traffic may not be intercepted by transparent proxy servers, which usually assume that it is a port 80 link. In order to overcome this problem, it may still be possible to include such non-standard ports, for example, once they are known, in the coverage of transparent proxy servers, or to review all traffic (sniffing).

It will be noted that the embodiments of the present invention described above may be employed in furtherance of various goals instead or in addition to detecting DNS spoofing by Trojans. It may be used, for example, to detect malfunctions or corruptions in the DNS data of client machines. It will further be noted that the present invention may be applicable to non-HTTP protocols, particularly if they require quoting the hostname as part of the request or in the response from the site.

Finally, while ISPs are an intended location or beneficiary of the present invention, it will be noted that the same invention may be used in connection with other settings, for example, in corporate firewalls or Internet gateways, and even locally, on client machines (e.g. in personal firewalls). In the latter implementation, a trusted source of DNS mapping (e.g. the ISP's DNS server) should be available to the solution in order to ensure that there is a trustworthy source against which to compare and verify IP addresses associated with hostnames.

Various devices, architectures, and/or systems or sets of devices, may form a system or perform a method according to embodiments of the present invention, and/or may effect a method according to embodiments of the present invention. Methods according to various embodiments of the present invention may, for example, be executed by one or more processors or computing systems (including, for example, memories, processors, software, databases, etc.), which, for example, may be distributed across various sites or computing platforms; alternatively some methods according to embodiments may be executed by single processors or computing systems. The following illustration outlines a solution architecture according to one embodiment of the present invention; other suitable architectures are possible in accordance with other embodiments of the invention.

FIG. 1 is a schematic block diagram illustration of a communication system 100 in accordance with some embodiments of the invention. System 100 may include, for example, a client or subscriber 110 and a server 120. System 100 may optionally include additional and/or other hardware components and/or software components.

Client 110 may be or may include, for example, a personal computer, a desktop computer, a mobile computer, a laptop computer, a notebook computer, a tablet computer, a Personal Digital Assistant (PDA) device, a wireless communication station, a wireless communication device, or the like.

Client 110 may include, for example, an Operating System (OS) 111, as well as one or more applications(s) 112, e.g., an Internet browser application, an Email client, or the like. Client 110 may further include a hosts file 113 and/or a network stack 114, e.g., a TCP/IP stack.

Client 110 may communicate with server 120 using a link 130, for example, one or more wired links, one or more wireless links, one or more connections, a network link, a TCP/IP link, an IPv6 link, or a link including one or more intermediary units (e.g., gateways, proxies, or the like).

Server 120 may be or may include, for example, an Internet sever located at an ISP. Server 120 may receive from client 110 through link 130 notification of an IP request, including, for example, the IP request itself. An analyzer 121 of server 120 may analyze the received IP request, e.g., to check whether a property of the requested hostname matches a property of the requested IP address. As previously described, the properties matched against each other may be, for example, IP address, and/or one or more other properties. For example, based on the requested hostname included in the IP request, the server processor or analyzer 121 may obtain a corresponding IP address from a source other than the IP request, e.g., from a local or remote DNS lookup table 122, or the like; the IP address obtained from a source other than the IP request may be referred to herein as a true or "real IP address".

Analyzer 120 may check whether the IP address included in the received IP request is identical to the real IP address obtained from a source other than the IP address. If the checking result is positive, then analyzer 120 may determine that the IP request is non-malicious, and server 120 may proceed to handle the IP request as received. If the checking result is negative, then analyzer 120 may determine that the IP request is malicious, in which case, server 120 may, for example, not handle the IP request as received, and/or instead or in addition, may perform one or more pre-defined handling procedures, e.g., using a handler 123.

For example, in one embodiment, handler 123 may send to client 110 a notification that the IP request received from client 110 is determined to be malicious. In another embodiment, handler 123 may send to a third party, e.g., a system administrator, an anti-virus manufacturer, a phish-fighter, or the like, a notification that the IP request received from client 110 is determined to be malicious. In yet another embodiment, handler 123 may redirect the communication such that client 110 is redirected to a certain web-site or web-page including a notification that the IP request received from client 110 is determined to be malicious. In still another embodiment, handler 123 may redirect the communication such that client 110 is redirected to the true or real IP address (e.g., obtained from a source other than the IP request) instead of to the IP address included in the IP request. In some embodiments, one or more of the above procedures may be used, and/or other suitable procedures may be used.

Although portions of the discussion herein may relate, for demonstrative purposes, to comparing the IP address included in the IP request and the true or real IP address (e.g., obtained from a source other than the IP request), other suitable comparisons and/or analysis may be performed. For example, in some embodiments, at least one property of the requested IP address may be compared with a corresponding property of the desired hostname. For example, instead or in addition to comparing IP address, the analyzer 121 may compare a domain owner of both the desired hostname and the requested IP address, for example, by using a reverse DNS lookup or a local or remote WHOIS database.

Figure 2:
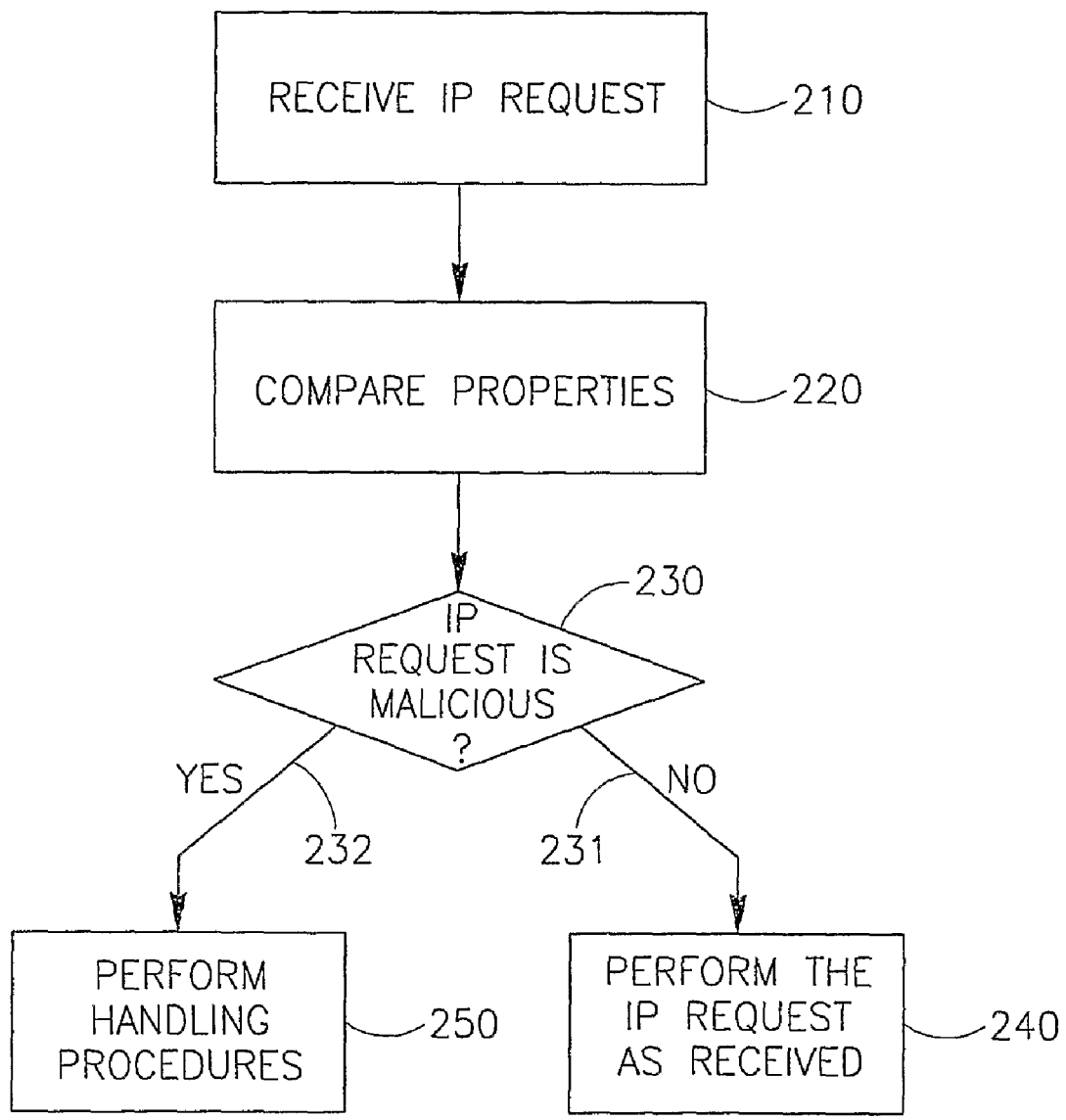
FIG. 2 is a schematic flowchart illustrating the method of detecting and mitigating DNS spoofing in accordance with an embodiment of the invention.

FIG. 2 is a schematic flow-chart of a method of detecting and mitigating DNS spoofing in accordance with some embodiments of the invention. Operations of the method may be implemented, for example, by system 100 of FIG. 1, by server 120 of FIG. 1, and/or by other suitable transceivers, units, stations, devices, and/or systems.

As indicated at box 210, the method may optionally include, for example, receiving an IP request, e.g., by a server from a client.

As indicated at box 220, the method may optionally include, for example, comparing a property of the IP address included in the IP request with a corresponding property of the hostname included in the request. This may include, for example, comparing the IP address included in the IP request with a real IP address obtained from a source other than the IP request (e.g., based on the requested hostname include in the IP request).

As indicated at box 230, the method may optionally include, for example, checking whether the comparison result indicates that the IP request is malicious.

If it is determined that the IP request is not malicious (arrow 231), then the method may optionally include, for example, performing the IP request as received (box 240).

In contrast, if it is determined that the IP request is malicious (arrow 232), then the method may optionally include, for example, performing one or more handling procedures (box 250). This may include, for example, sending a notification to the client, sending a notification to a third party, redirecting the client to a web-site presenting a notification, redirecting the client to a web-site based on the true or real IP address, and/or other suitable handling procedures.

Other suitable operations or sets of operations may be used in accordance with embodiments of the invention.

In some embodiments, the method may be selectively implemented, for example, only with regard to one or more pre-defined users, subscribers, sponsor entities, or the like. For example, in one embodiment, a sponsor entity (e.g., a banking entity, an insurance provider, a credit card provider, or the like) may register with the ISP such that the ISP monitors IP requests (e.g., incoming from various users) that refer to the sponsor entity, e.g., by the hostname and/or by the IP request, and to check whether such IP requests are malicious. In another embodiment, for example, a computer user may register with the ISP such that the ISP monitors IP requests incoming from that computer user, and to check whether such IP requests are malicious. Other suitable registration methods may optionally be used in accordance with embodiments of the invention.

It will be appreciated by persons skilled in the art that embodiments of the invention are not limited by what has been particularly shown and described hereinabove. Rather the scope of at least one embodiment of the invention is defined by the claims below.

We claim:

1. A method for detecting spoofing, the method comprising:
   receiving notification of an IP request originated by a browser application, said IP request being associated with a requested IP address and a desired hostname;
   detecting whether the requested IP address matches the desired hostname; and
   if said requested IP address does not match said hostname, then:
      obtaining a correct IP address associated with said desired hostname; and
      directing said browser application to said correct IP address.

2. The method of claim 1, wherein said step of detecting whether the requested IP address matches the desired hostname comprises comparing at least one property of the requested IP address with a comparable property of the desired hostname.

3. The method of claim 1, wherein if said IP address does not match said hostname, further comprising preventing connection to said IP address.

4. The method of claim 1, wherein said step of detecting comprises:
   obtaining a true hostname associated with said requested IP address; and
   comparing said true hostname with said desired hostname.

5. The method of claim 4, wherein obtaining a true hostname associated with said requested IP address comprises using a reverse DNS lookup database.

6. The method of claim 4, wherein obtaining a true hostname associated with said requested IP address comprises using a WHOIS database to look up identity of said requested IP address.

7. The method of claim 1, wherein said IP request is made by said browser application of a subscriber using a computing device, and wherein if said IP address does not match said hostname, further comprising sending a notification to said subscriber computing device.

8. The method of claim 1, wherein said IP request is made by said browser application of a subscriber using a computing device, and wherein if said IP address does not match said hostname, further comprising directing said browser application of said subscriber to an Internet website informing said subscriber that said IP address does not match said hostname.

9. The method of claim 1, wherein if said IP address does not match said hostname, further comprising sending a notification to a third party.

10. The method of claim 1, wherein said notification of said IP request is a reply from a domain name server directed to said browser application of a subscriber, said reply including said requested IP address.

11. The method of claim 1, wherein said notification is an IP request received by an internet service provider (ISP) from a subscriber of said ISP.

12. A method comprising:
   receiving a notification of a request sent by a browser application of a client computer to a network address, said request being associated with a requested network address and a desired hostname;
   detecting whether the requested network address matches the desired hostname; and
   if said requested network address does not match said hostname, then:
      obtaining a correct network address associated with said desired hostname; and
      directing said browser application to said correct network address.

13. The method of claim 12, wherein the network address is an IPv6 network address.

14. A computer system comprising:
   a server computer including an analyzer processor to receive notification of an IP request originated by a browser application operating on a client computer, said IP request being associated with a requested IP address and a desired hostname, and to detect whether the requested IP address matches the desired hostname;
   wherein if said requested IP address does not match said hostname, then said server is to:

obtain a correct IP address associated with said desired hostname; and direct said browser application to said correct IP address.

15. The computer system of claim 14, wherein said analyzer processor is to compare at least one property of the requested IP address with a comparable property of the desired hostname.

16. The computer system of claim 14, wherein said notification is received from said browser application operating on said client computer, and wherein said server computer is to prevent connection of said browser application to said IP address if said IP address does not match said hostname.

17. The computer system of claim 14, wherein said analyzer processor is to obtain a true hostname associated with said requested IP address, and to compare said true hostname with said desired hostname.

18. The computer system of claim 17, wherein said analyzer processor is to obtain said true hostname associated with said requested IP address using a reverse DNS lookup database.

19. The computer system of claim 17, wherein said analyzer processor is to obtain said true hostname associated with said requested IP address using a WHOIS database able to look up identity of said requested IP address.

20. The computer system of claim 14, wherein said IP request is made by a subscriber using said browser application on the client computer, and wherein if said IP address does not match said hostname, said server computer is to send a notification to said subscriber.

21. The computer system of claim 14, wherein said IP request is made by a subscriber using said browser application on the client computer, and wherein if said IP address does not match said hostname, said server computer is to direct said browser application of said subscriber to an Internet website informing said subscriber that said IP address does not match said hostname.

22. The computer system of claim 14, wherein if said IP address does not match said hostname, said server computer is to send a notification to a third party.

23. The computer system of claim 14, wherein said notification of said IP request is a reply from a domain name server directed to a subscriber, said reply including said requested IP address.

24. The computer system of claim 14, wherein said notification is an IP request received by an internet service provider (ISP) from a subscriber of said ISP.

25. The computer system of claim 14, further comprising a client computing platform to send to said server computer said notification of IP request.

26. A method comprising:
receiving at a computing device a notification of a request originated by a browser application, said request including a physical address of a computing element being associated with a requested physical address and logical address; and
determining whether said requested physical address matches the logical address;
wherein if said requested physical address does not match said logical address, then said computing device is to:
obtain a correct physical address associated with said logical address; and
direct said browser application to said correct physical address.

27. The method of claim 26, wherein the physical address is selected from a group consisting of: an IP address of an Internet site, a network address, and an IPv6 address, and at least a portion of a header of an electronic mail header.

28. The method of claim 26, wherein the logical address is selected from a group consisting of: a hostname, and a Uniform Resource Locator (URL).

29. The method of claim 26, wherein the computing device is selected from a group consisting of: a Personal Computer (PC), a DNS server, an HTTP server, and a firewall device.

30. The method of claim 26, wherein the step of determining whether said requested physical address matches the logical address comprises using a WHOIS database.

31. The method of claim 26, wherein the determining whether said requested physical address matches the logical address comprises performing DNS queries to DNS servers to using the requested physical address and comparing a logical address returned in response to such DNS queries to said logical address.

32. The method of claim 2, comprising:
determining whether the requested IP address appears in a pre-defined white list of IP addresses.

33. The method of claim 2, comprising:
determining whether the requested IP address does not appear in a pre-defined black list of IP addresses.

34. The method of claim 2, comprising:
determining whether the requested IP address does not correspond to a pre-defined domain name.

35. The method of claim 2, wherein detecting comprises detecting using at least one of a cache proxy server, a content inspection server, an HTTP-aware device, a device able to sniff network data, a transparent proxy server, and a plurality of distributed computing platforms.

36. A method for detecting spoofing, the method comprising:
receiving notification of an IP request originated by a browser application, said IP request being associated with a requested IP address and a desired hostname;
detecting whether the requested IP address matches the desired hostname; and
if said IP address does not match said hostname, notifying an entity in control of a network in which the IP request was transferred.

37. A method for detecting spoofing, the method comprising:
receiving notification of an IP request originated by a browser application, said IP request being associated with a requested IP address and a desired hostname wherein said IP request is made by a subscriber;
detecting whether the requested IP address matches the desired hostname, wherein if said IP address does not match said hostname, further comprising:
obtaining a correct IP address associated with said desired hostname.

38. The method of claim 1, comprising:
based on a physical address class, detecting whether the requested IP address matches the desired hostname.

39. The method of claim 1, comprising:
based on a physical address class included in a pre-defined list of IP addresses, detecting whether the requested IP address matches the desired hostname.

40. The method of claim 1, further comprising:
performing a corrective operation on said IP request.

41. The method of claim 40, wherein the corrective operation is selected from a group consisting of: notifying a client from which the IP request originated, cleaning a Trojan in a client from which the IP request originated, obtaining a correct IP address from a trusted source, sending a security notification to a client from which the IP requested originated, sending a notification to an anti-virus manufacturer, performing a silent rerouting, sending a notification to a phish-fighting entity, and communicating with a help desk.

42. The method of claim 1, further comprising:
performing a corrective operation on said IP request at a server of an ISP.

43. The method of claim 1, further comprising:
if the desired hostname corresponds to a sponsor entity, detecting whether the requested IP address matches the desired hostname.

44. The method of claim 1, further comprising:
if the desired hostname corresponds to a sponsor entity, performing a corrective step on said IP request.

45. The method of claim 1, further comprising:
if the desired hostname corresponds to a sponsor entity, performing a corrective step on said IP request at a server of an ISP.

46. The method of claim 1, further comprising:
if the desired hostname corresponds to a sponsor entity, notifying said sponsor entity.

47. The method of claim 2, comprising:
determining by an ISP server whether the requested IP address does not correspond to a pre-defined domain name.

48. The method of claim 2, comprising:
determining by a firewall server whether the requested IP address does not correspond to a pre-defined domain name.

49. The method of claim 2, comprising:
determining by an Internet gateway whether the requested IP address does not correspond to a pre-defined domain name.

50. The method of claim 2, comprising:
determining by a personal computer whether the requested IP address does not correspond to a pre-defined domain name.

* * * * *